Patented Oct. 22, 1929

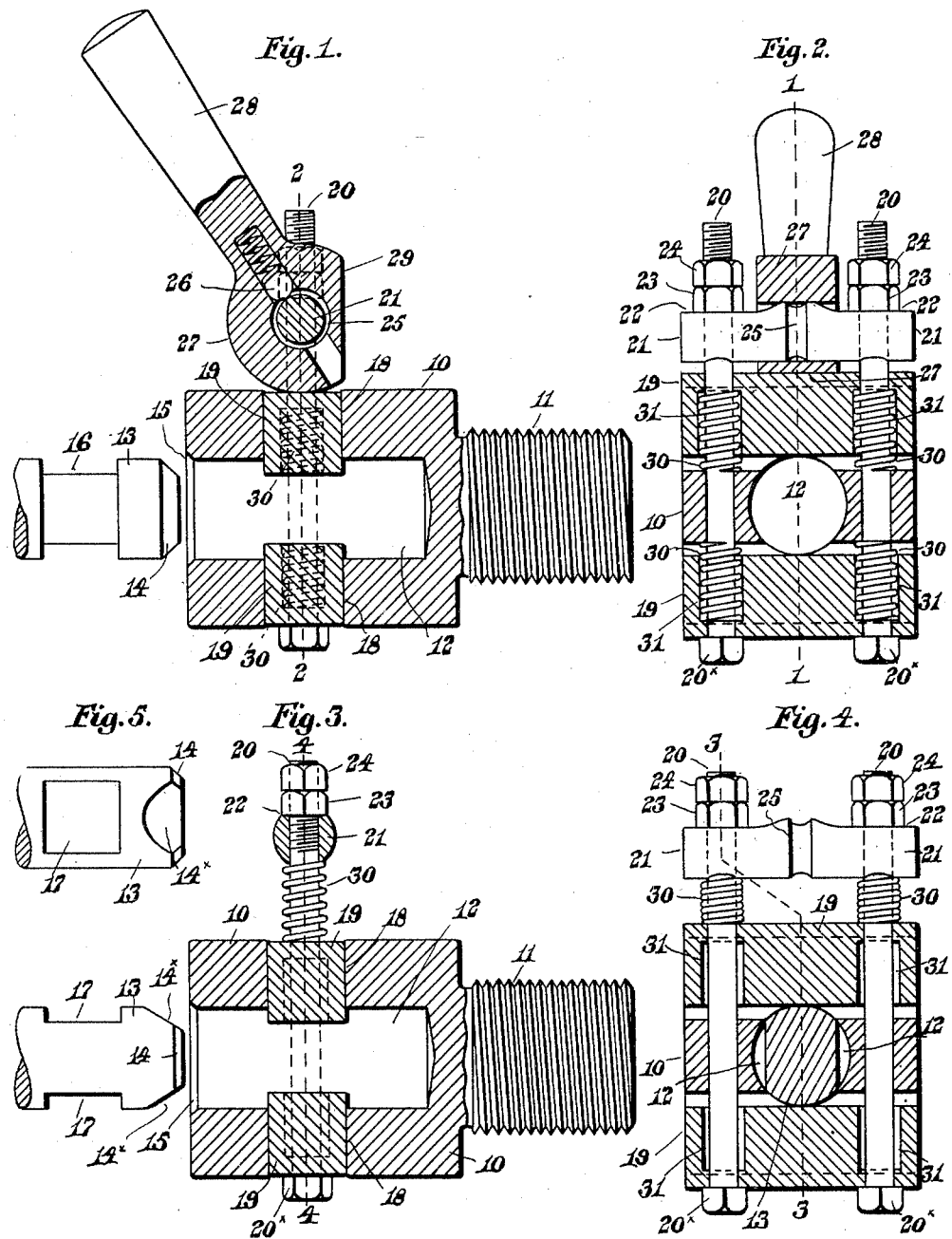

1,732,445

UNITED STATES PATENT OFFICE

FRANCIS J. LAPOINTE, OF ANN ARBOR, MICHIGAN

QUICK-ACTING BROACH-LOCKING DEVICE

Application filed April 21, 1927. Serial No. 185,474.

This invention relates to locking devices for connecting the pulling end of a broach to the reciprocating carriage of a broaching machine and has for its object the provision of a simple device of this character which will be quick acting.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

In the drawings:

Figure 1 represents a section of a device embodying the principles of the present invention, the cutting plane being on line 1, 1, on Fig. 2.

Figure 2 represents a transverse section of the same on line 2, 2, on Fig. 1.

Figure 3 represents a section of said device with the cam removed and the springs on the connecting rods disposed on the outer ends of said rods, the cutting plane being on line 3, 3, on Fig. 4.

Figure 4 represents a section of the same on line 4, 4, on Fig. 3, and

Figure 5 represents a side elevation of the pulling end of a broach.

Similar characters indicate like parts throughout the several figures of the drawings.

In the drawings 10 is a block provided with a threaded shank 11 by which said block 10 may be secured to the usual reciprocating carriage of a broaching machine.

This block 10 is provided with a socket 12 alined with the axis of the shank 11 and adapted to receive the pulling end 13 of a broaching tool of usual construction.

The end 13 is cone-shaped at 14 to facilitate the insertion of said end into the socket 12, the mouth of which is flaring as at 15 for the same purpose.

With a round broaching tool the end 13 is provided with an annular groove 16 as indicated in Fig. 1 but when a broaching tool is to be used which is not round the end 13 thereof is provided with two oppositely disposed slots 17, the bottoms of which are flat and parallel as shown in Figs. 5 and 6.

Formed in the periphery of the block 10 are two grooves 18 oppositely disposed and in each of which is disposed a jaw 19.

Extending through the opposite ends of the jaws 19 and the block 10 are connecting rods 20, the lower ends of which have heads 20ˣ bearing against the under jaw 19 as shown in Figs. 1 and 2.

The upper ends of the rods 20 extend through holes in the opposite ends of a cylindrical member 21 flattened at 22 to make seats for the adjustable nuts 23 threaded to said rods, these rods also having threaded thereto lock nuts 24.

The member 21 midway of its length is provided with a concave groove 25 with which coacts a spring pressed ball 26 carried by a cam 27 having an opening therein through which said member 21 extends.

The ball 26 in the groove 25 prevents any lateral movement of the cam 27 relatively to the member 21.

The cam 27 is provided with an actuating handle 28 and a flat face 29.

Surrounding the rods 20 are springs 30 with their outer ends disposed in depressions 31 in the opposite ends of the jaws 19.

When the cam 27 is moved about the axis of the member 21 until the flat face 29 thereof is in contact with the upper face of the block 10, the springs 30 will separate the jaws 19 so that no portion thereof will extend into the socket 12 as shown in Fig. 2.

When in this position the end 13 of the tool can be inserted readily into said socket 12.

If the cam 27 is then moved into the position shown in Fig. 1 the jaws 19 will be moved towards each other into the socket 12 and if the end 13 is at this time disposed in said socket the projecting portions of the jaws will enter the annular groove 16 and securely lock the tool in the block 10.

The block 10 is flat sided to receive a wrench when the block is being screwed into the reciprocating carriage of the broaching machine.

The tool 13 may be quickly removed from the block 10 when the cam 27 is again moved into a position with the flat face 29 in contact with the flat upper face of the block 10.

When a broaching tool is used provided with the flat faced slots 17 the cam 27 may be dispensed with by removing the springs 30 from a position between the jaws 19 and disposing said springs around the rods 20 between the upper jaw 19 and the cylindrical member 21, as shown in Figs. 3 and 4.

When so disposed the springs will force the jaws 19 towards each other with portions thereof projecting into the socket 12.

When the end 13 of the broaching tool is inserted into the socket 12 the inclined surfaces 14$^x$ thereof coming into contact with the jaws 19 will force said jaws apart until the slots 17 register with said jaws at which time the springs 30 will force the jaws into the slots and lock the tool in position.

This is of considerable importance as the jaws 19 coacting with the flat faced slots 17 will always register the tool in the same position for each operation which is very essential where a flat sided broach is being used.

When it is desired to remove the broaching tool it may be turned into the position indicated in Fig. 4, thereby again separating the jaws 19 and permitting the quick removal of said tool.

This makes a very simple device for locking broaching tools to the reciprocating carriage of a broaching machine and which may be utilized in connection with either a round broaching tool with an annular groove in its pulling end or a tool not round and having flat sided slots in its pulling end.

It is believed that the operation and many advantages of the invention will be readily understood without further description.

Having thus described my invention, I claim—

1. A block provided at one end with attaching means and at the other end with a cylindrical socket, said block having oppositely disposed grooves extending transversely of and communicating with said socket; jaws movable in said grooves toward and from each other; rods extending through said block and the opposite ends of said jaws and having heads engaging one jaw; a member connecting the opposite ends of said rods; means for adjusting said connecting member lengthwise of said rods; means coacting with said jaws for separating them; and a cam for moving said jaws toward each other with portions thereof disposed transversely in said socket.

2. A block provided at one end with attaching means and at the other end with a cylindrical socket, said block having oppositely disposed grooves extending transversely of and communicating with said socket; jaws fitted to and movable in said grooves toward and from each other; rods extending through said block and the opposite ends of said jaws; a cylindrical member through which the opposite ends of said rods extend; springs for separating said jaws; and a cam mounted upon said cylindrical member for moving said jaws toward each other with portions thereof disposed transversely in said socket.

3. A block provided at one end with attaching means and at the other end with a cylindrical socket, said block having oppositely disposed grooves extending transversely of and communicating with said socket; jaws fitted to and movable in said grooves toward and from each other; rods extending through said block and the opposite ends of said jaws; a cylindrical member through which the opposite ends of said rods extend, said member having an annular groove midway thereof; springs for separating said jaws; a cam mounted upon said cylindrical member for moving said jaws toward each other with portions thereof disposed transversely in said socket; and a spring pressed ball in said cam coacting with said groove.

4. A block provided at one end with attaching means and at the other end with a cylindrical socket, said block having oppositely disposed grooves extending transversely of and communicating with said socket; jaws fitted to and movable in said grooves toward and from each other; rods extending through said block and the opposite ends of said jaws; a cylindrical member through which the opposite ends of said rods extend; springs for separating said jaws; a cam mounted upon said cylindrical member for moving said jaws toward each other with portions thereof disposed transversely in said socket; and means preventing movement of said cam lengthwise of said cylindrical member.

5. A block provided at one end with means for attachment to a movable member and having a cylindrical tool-receiving socket at its opposite end; two spring-pressed jaws with portions thereof adapted to extend into and transversely of said socket; a pair of rods extending through said block on which both jaws are freely movable; and means outside one face of said block and mounted upon said rods for moving said jaws against the tension of the springs.

6. A block provided at one end with an integral threaded shank for attachment to a movable member and having a tool-receiving socket at the opposite end, said block having oppositely disposed grooves extending from its outer boundary transversely of and communicating with said socket; jaws movable in said grooves and adapted to project into said socket; rods extending through said block and the opposite ends of said jaws; springs for moving said jaws apart; and means supported on said rods outside said block for moving said jaws toward each other with portions thereof extending into said socket.

7. A block provided at one end with attaching means and at the other end having a cylindrical tool-receiving socket, said block having oppositely disposed grooves extending from its outer opposite faces transversely of and communicating with said socket; rods extending through said block and freely movable therein; jaws on said rods movable in said grooves toward and from each other; means limiting the separation of said jaws; and other means carried by said rods and opposite an outer face of said block coacting with one jaw for moving both jaws toward each other with portions thereof projecting into said socket.

8. A block provided at one end with attaching means and at the other end with a tool-receiving socket; two movable jaws carried thereby normally outside the tool-receiving socket and extending transversely thereof; means extending through said block for retaining said jaws in parallelism during their movement whereby the inward movement of one jaw will effect a positive movement of the other jaw inwardly; springs for separating said jaws; and means outside one face of said block coacting with one jaw for moving both jaws toward each other with portions projecting into said socket.

9. A block provided at one end with attaching means and at the other end with a cylindrical tool-receiving socket; two movable jaws carried thereby and extending transversely of said socket; parallel rods extending through and freely movable endwise in said block and the opposite ends of said jaws; springs surrounding said rods and interposed between and adapted to separate said jaws; and cam mechanism carried by said rods and coacting with one jaw for compressing said springs and moving both jaws into position with portions thereof projecting into said socket.

10. A block provided at one end with a threaded shank for attachment to a movable member and having a tool-receiving socket at the opposite end in axial alinement with said shank, said block having oppositely disposed flat faced grooves extending from opposite outer faces thereof transversely of and communicating with said socket; flat faced jaws movable in said grooves and adapted to project into said socket; rods extending through said block and the opposite ends of said jaws and freely movable endwise therein; springs surrounding said rods for moving each jaw in one direction; and means coacting with one jaw for moving said jaws in the opposite direction.

11. A block provided at one end with attaching means and at the other end having a cylindrical tool-receiving socket, said block having oppositely disposed flat faced grooves extending from opposite outer faces thereof transversely of and communicating with said socket; flat faced jaws fitting said grooves and movable toward and from each other; rods extending through said block and the opposite ends of said jaws and freely movable endwise therein; resilient means interposed between said jaws for separating them; means on said rods limiting the separation of said jaws; and other means outside one face of said block and supported by said rods for moving said jaws toward each other with portions thereof projecting into said socket.

12. A block provided at one end with attaching means and at the other end with a cylindrical tool-receiving socket, said block having oppositely disposed grooves extending transversely of and communicating with said socket; jaws movable in said grooves toward and from each other; rods extending through said block and the opposite ends of said jaws and having heads engaging one jaw; a member connecting the opposite ends of said rods which project beyond one face of said block; means for adjusting said connecting member lengthwise of said rods; means coacting with said jaws for separating them; and other means supported by and movable on said connecting member for moving said jaws toward each other with portions thereof disposed transversely in said socket.

13. A block provided at one end with attaching means and at the other end with a cylindrical tool-receiving socket, said block having oppositely disposed grooves extending from its opposite outer faces transversely of and communicating with said socket; jaws fitted to and movable in said grooves toward and from each other; positive connections between said jaws whereby movement of one jaw in one direction will cause movement of the other jaw in the opposite direction; springs for separating said jaws; and means outside said block and coacting with the outer face of one jaw for moving both jaws toward each other with portions thereof disposed transversely in said socket.

Signed by me at Ann Arbor, Michigan, this 18th day of April, 1927.

FRANCIS J. LAPOINTE.